P. VAN LEGGELO.
DIRECT ASCENT FLYING MACHINE.
APPLICATION FILED JAN. 5, 1918.
1,435,190.
Patented Nov. 14, 1922.
5 SHEETS—SHEET 5.
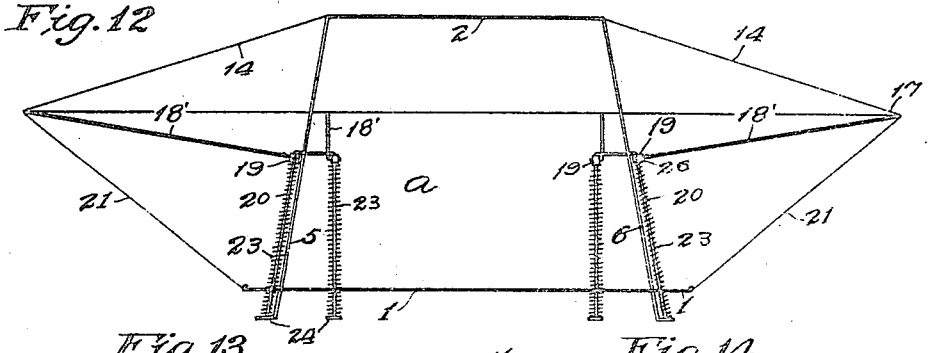
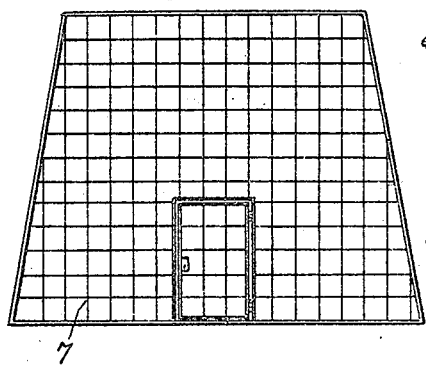
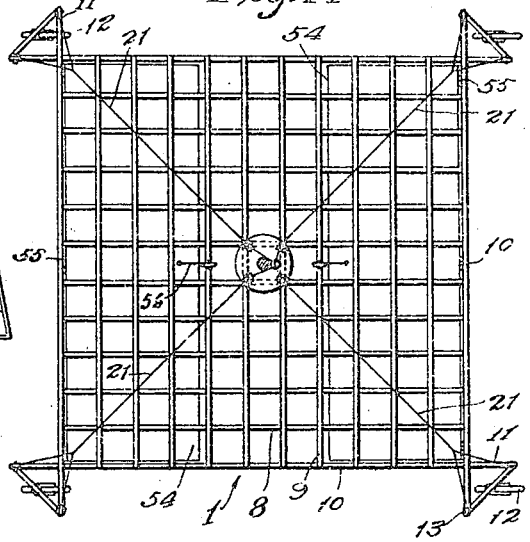
Witness
E. E. Holly
Inventor
Pieter Barteld van Leggelo
by James R. Townsend
his atty.

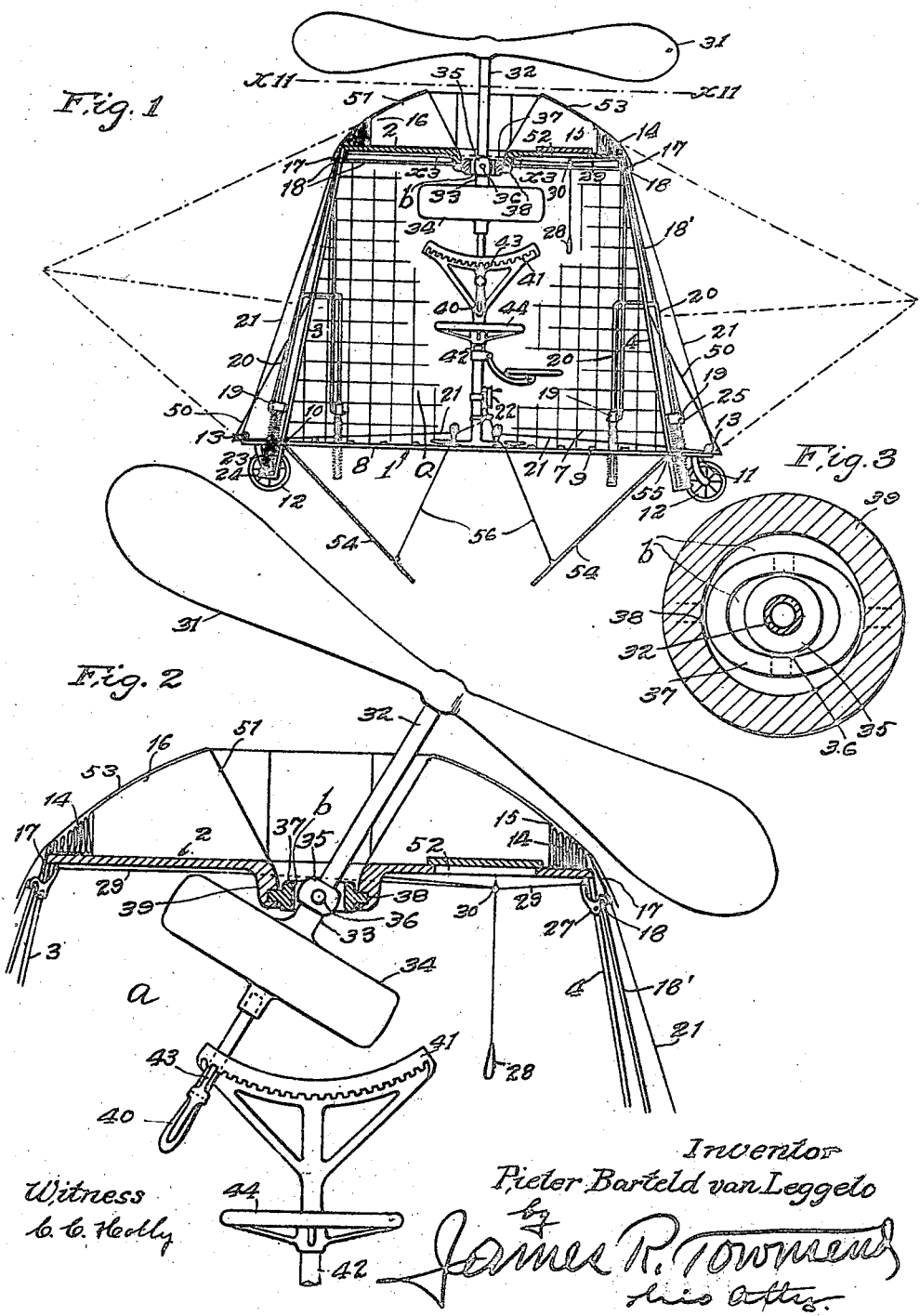

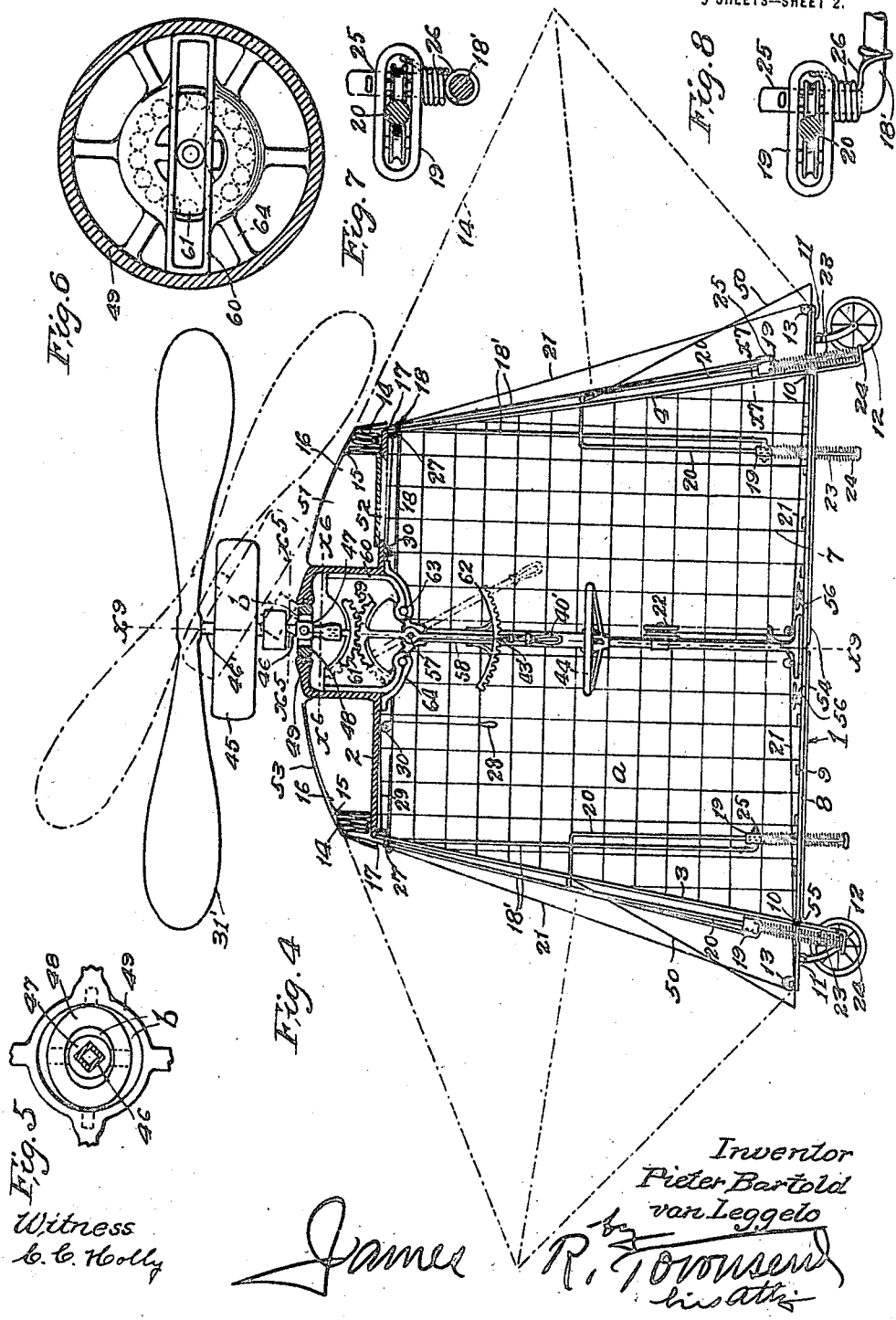

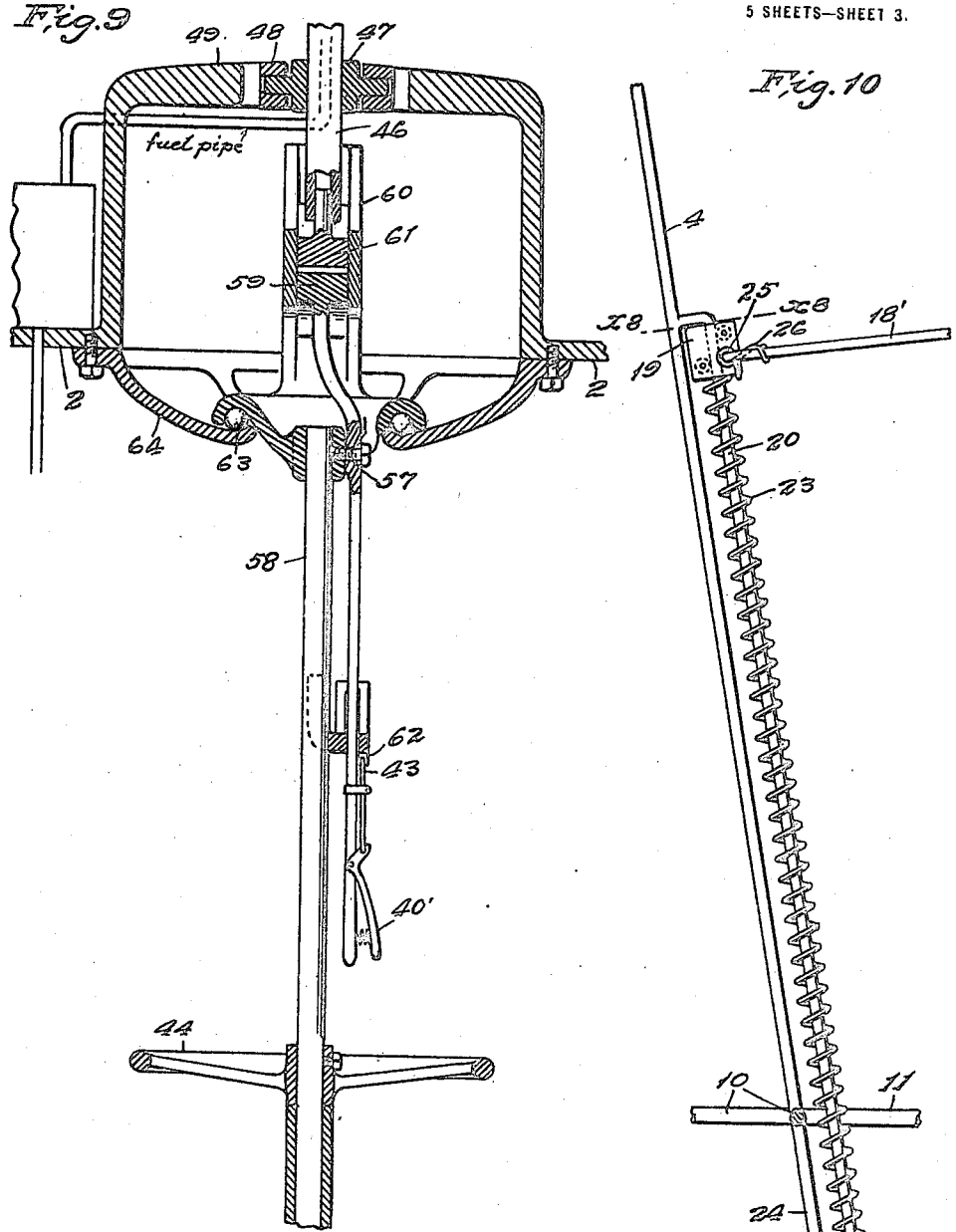

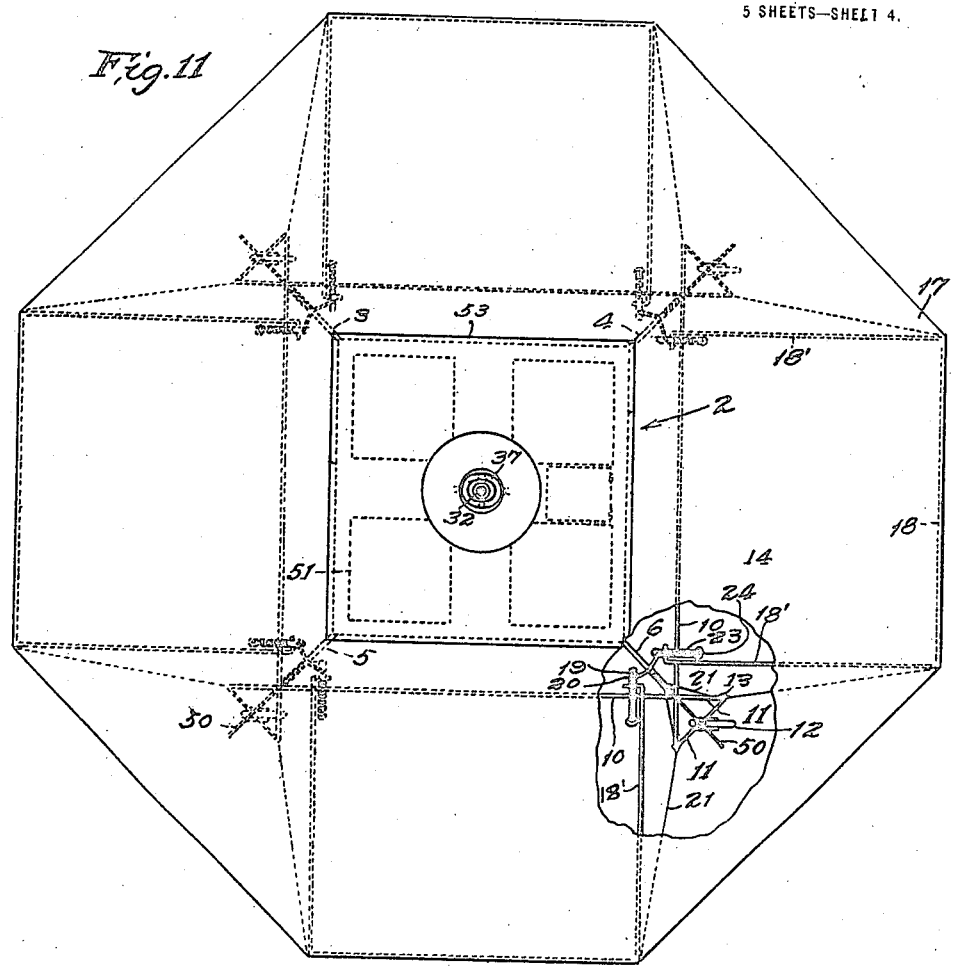

Patented Nov. 14, 1922.

1,435,190

UNITED STATES PATENT OFFICE.

PIETER VAN LEGGELO, OF LOS ANGELES, CALIFORNIA.

DIRECT-ASCENT FLYING MACHINE.

Application filed January 5, 1918. Serial No. 210,792.

*To all whom it may concern:*

Be it known that I, PIETER VAN LEGGELO, a subject of the Queen of the Netherlands, formerly of Batavia, Java, residing at 2405 West Sixth Street, Los Angeles, California, have invented a new and useful Direct-Ascent Flying Machine, of which the following is a specification.

This invention relates to heavier than air flying machines.

An object of this invention is to provide a practical flying machine adapted to a use and operation not possible with the aeroplane form of flying machine now in common use.

Objects of the invention in contradistinction to the well-known aeroplane are: reduction of the floor space required for storage, for starting ascent, and for landing; facility of direct ascent and descent so as to allow an aviator to rise without having to use a horizontal running space in starting ascent; to enable the aviator to hover in the air over any selected spot on the surface of the earth for the purpose of accurate observation and also for the purpose of long protracted observation.

An object is to provide a flying machine by means of which operatives may hover over marine expanses likely to be infested with hostile submarines, so that more careful observation may be made than is possible with the aeroplane which, from the laws of its construction is only able to keep aloft by rapid flight.

Another object is to enable the aviator to more accurately direct depth bombs to the destruction of submarine craft discovered while hovering in the air, it being calculated that by having command of a flying machine, thus remaining relatively stationary, an aviator may more accurately determine the point at which the depth bomb will enter the water, and therefore will be able to attack the submarine with accuracy and effectiveness.

Another object of the invention is to construct a flying machine which may be practically invisible from the earth when at a height above its surface so as to afford a protection to the aviator and the flying machine, against the attack of anti-aircraft guns.

A further object is to provide simple and effective means whereby the direct ascent aircraft may be guided at the will of the aviator.

Another object is to make provision for safe and slow descent of the aircraft in case of engine trouble or stoppage of the propeller.

An object of the invention is to provide a flying machine by means of which large quantities of high explosives may be safely conveyed to points above submarine and naval bases of the enemy, so that the vessels at such bases may be destroyed. The invention is also intended to make it possible to safely attack hostile inland fortifications, bodies of troops, and depots of munitions and supplies, and also railroad centers, and thereby to disarm the enemy.

This invention is basic, broadly new and pioneer in that this flying machine comprises a base, a deck above the base, a frame rigidly connecting the base and deck and separating the same from each other to form a chamber or compartment for an aviator, and is provided with a propeller mounted above the deck and connected thereto to support the same, and is propelled by means under the control of the aviator within the chamber below the deck.

The invention is also basic and pioneer in that I have provided parachute means out of the way of the aviator and normally folded to minimize air resistance and adapted and arranged to come into action to support the flying machine in case of engine trouble.

Other broad, basic and pioneer features reside in the construction and arrangement of the mechanism whereby the avator may change the angular relation of the propeller to the axis of the suspended frame so as to enable the aviator to easily give desired direction to the flying machine and to quickly change such direction to any point of the compass.

It is understood that aluminum, steel, various fabrics and other materials may be employed in constructing the machine to secure the usual advantages of the best practice in aircraft construction and that radial, rotary cylinder and other types of motors may be employed, and the invention is not limited to specific materials or forms of motors.

Simplicity, strength and practical ease and certainty of operation are objects in view.

The invention may be carried out in various ways and with various forms of propeller and it is understood that the form of propeller to be employed and the speed with which it will be driven will be determined by the best aeronautical practice and no attempt will be made herein to illustrate the specific form of propeller which may, in practice, be found best adapted to the work.

An object of the invention is to make provision for positive opening of the parachute at the will of the aviator and to insure against careening and overturning on the parachute descent.

This invention is adapted to be carried out with various forms of motors and supporting frames and will be illustrated as embodied with two forms of motor and with a mounting of one of said forms together with the propeller above the deck and the other of said forms below the deck above which the propeller is mounted.

An object of this invention is to provide simple and practical means for steering and stabilizing the flying machine, and although it is not intended to limit the invention to a specific means for steering the flying machine, especial attention has been directed toward steering the flying machine by making the propeller dirigible, and this has been effected by connecting the motor in a determined angular relation to the axis of the propeller and providing means for moving the propeller and motor simultaneously into the same angular relation with the frame of the machine.

Other objects, advantages and features of invention may appear from the accompanying drawings, the subjoined detail description and the appended claims.

The accompanying drawings illustrate the invention.

Figure 1 is a broken sectional elevation of a flying machine constructed in accordance with this invention ready for ascent. Dot-and-dash lines indicate the spread position of the parachute.

Fig. 2 is an enlarged fragmental detail of the upper part of the machine shown in Fig. 1 with parts in extreme position for lateral propulsion.

Fig. 3 is a plan on a large scale in section on line $x^3$, Fig. 1.

Fig. 4 is an elevation partly in mid-section of the flying machine with the motor arranged above the deck.

Fig. 5 is a plan section in enlarge scale on line $x^5$, Fig. 4.

Fig. 6 is a plan detail in enlarged section on line $x^6$, Fig. 4.

Fig. 7 is an enlarged plan sectional detail on line $x^7$, Fig. 4, showing one of the parachute extenders retracted.

Fig. 8 is an enlarged plan sectional detail on line $x^8$, Fig. 10, showing one of the parachute extenders extended.

Fig. 9 is an enlarged fragmental axial section on line $x^9$, Fig. 4.

Fig. 10 is a fragmental detail elevation of a part of the parachute frame and springs in extended position.

Fig. 11 is a plan of the machine with parachute extended in descent out of propeller control as indicated by dot-and-dash lines in Fig. 1; the propeller being omitted from this view and the shaft sectioned at $x^{11}$, Fig. 1.

Fig. 12 is a diagrammatic elevation of the frame below the deck.

Fig. 13 is an elevation of the side of the frame cut away in Figs. 1 and 4.

Fig. 14 is a plan of the base detached.

The main frame of the flying machine may be of any suitable construction and is shown as comprising the base or floor frame 1, the deck 2 and corner posts 3, 4, 5, 6, connecting the base and the deck together, thus making a skeleton frame for the carriage, compartment, chamber or enclosure $a$ sufficiently commodious for the operators, the cargo and the passengers for which the machine is intended. The deck 2 is preferably of less dimensions than the floor frame 1, so that the corner posts converge upwardly; and the frame completed by the wire mesh walls 7 on each side will be of truncated pyramidal form.

The base 1 may be constructed in the form of a grid by means of cross bars 8 and 9 fastened to the side bars 10 which are extended beyond the side walls 7 to form outriggers 11 at the corners for attachment of the swivel ground wheels 12 and the parachute cord lower pulleys 13.

An annular collapsible parachute sheet 14 is connected by its rim 15 with supports 16 at the upper part of the deck 2 and is normally collapsed and stored above the deck 2 at the upper part of the flying machine, and has its outer rim 17 connected with the peripheral bars 18 of the parachute frame sections which are formed of said peripheral bars 18 and side bars 18', the lower and inner ends of said bars 18' being connected with slides 19 sliding upon guides 20 that extend up and down outside of the side walls 7 a sufficient distance to allow the slide 19 to move up far enough to permit the parachute extension frames 18, 18' to extend laterally for the purpose of fully expanding the parachute. Lines 21 connected with the outer ends of the parachute frames are led around the pulleys 13 and thence to the spring-operated take-up or winding apparatus 22 inside the compartment.

Means are provided to move the slides 19 up the guides 20 simultaneously with the parachute-expanding movement of the parachute frames 18, 18', and such means for moving the slides up comprise spiral springs 23 carried by supports 24 near the corners of the frame and adapted to simultaneously drive the lower ends of the parachute frames up when they are free to so move.

The parachute frames are hinged to the slides 19 on horizontal axes 25, and are adapted to be forced into extended position by coil springs 26. The peripheral bars 18 of the parachute are engaged by latches 27 that restrain all said parachute framesprings and that are pivoted to the upper part of the main frame; and that are released by operating a handle 28 at a central station; said handle being shown as connected by means of flexible connections 29 bent over pulleys 30, so that the operator by pulling upon the handle 28 may simultaneously release all of the latches, thus allowing springs 26 to extend the parachute frames 18, 18'; driving the peripheral bars 18 downward and outward. At the same time the lifting springs 23 will act to drive the lower and inner ends of the parachute frames upward toward the mid-height of the main frame where they come to rest in the extended position. The springs 23 and 26 are unitedly of sufficient power, with a coefficient of safety in excess thereof, to support the weight of the deck and all of the load carried thereby, including the frame, the engine, etc., so that in case the propeller becomes inactive and an accidental descent is begun, the parachute will support the load and prevent too rapid descent.

The spring-operated winding apparatus 22 will also be set when the parachute is collapsed and all of the springs 23, 26 as well as the take-up will be in readiness for instant operation to expand the parachute when necessity requires.

The lines and springs for extending the parachute are symmetrically arranged as described for each of the sides of the main frame, and it is regarded practical to construct the frame and its deck with as many sides as may be deemed best in the judgment of the constructor.

Suitable limited outlets b for compressed air at the inner parts of the parachute are provided so that the machine will not careen and capsize on descent. These outlets may be of any size and location that will best serve the purpose. They are shown as being located centrally of and extending directly up through the deck.

The dirigible propeller 31 may be of any form found best adapted to the purpose of vertical ascent when the propeller shaft is upright, and to the double purpose of support and lateral propulsion by said propeller when said shaft is deflected. At present it is understood that the propeller blades should be relatively broad as compared with the propeller blades employed in aeroplanes, and that the pitch of said blades should be such as to afford maximum support and lifting effect for the deck and the parts connected thereto relative to the speed and the angular position of the plane of revolution. These are questions to be determined by those skilled in the art to meet the exigencies and conditions of the various flying machines that may be built to embody the principles of this invention.

In some instances the propeller driving motor may be mounted above the deck and in others below it and both forms are shown, although it is at present deemed the best practice to mount the propeller motor below the deck as indicated in Figs. 1 and 2.

In Figs. 1 and 2 the propeller 31 is fixed to the crank shaft 32 which is journaled in bearings 33 fixed to the motor frame 34 and to the inner member 35 of the propeller and motor support which is a binnacle joint. Said inner member 35 is pivoted by the trunnions 36 to the ring 37 that is pivoted by the trunnions 38 to the deck 2 through the medium of the brackets 39. The axes of the trunnions 38 intersect each other and the axis of the propeller shaft 32 on a horizontal plane, and are normal to the axis of the propeller shaft 32 when said shaft is upright as in Fig. 1 for vertical ascent and descent.

The angular relation of the shaft 32 to the plane of the deck 2 and to the axis of the flying machine, is controlled by a handle 40 controlled by the aviator. A segment 41 drawn to the intersection of the pivotal axes 36, 38 of the binnacle joint is revolvably mounted on an axis 42 that is normal to the plane of the deck 2, and said handle 40 is adjustable along said segment 41 and adapted to be fixed thereto at any adjusted position by the latch 43 so as to lock the shaft 32 positively in any required angular position, relative to the deck 2. The segment 41 is adapted to be revolved by suitable means as the wheel 44 under the control of the aviator whenever the shaft 32 and the handle 40 are alined with the axis 42; that is to say, when the propeller is in position for direct vertical ascent or descent. Then by revolving the segment on its axis 42 so as to point to a particular point of the compass, the parts are brought into position whereby the aviator may deflect the axis of the propeller 31 to said point of the compass by simply releasing the latch 43 and swinging the handle to the desired angle which must be determined by the aviator and is dependent upon the direction in which the machine is to travel, and also the rarefaction of the atmosphere at the time of travel.

It is understood that when the travel of the machine is toward a point of the horizon, its momentum and the impulse of the propeller will tend to maintain that direction indefinitely and that an attempt to change the direction of the machine by revolving the segment during operation of the propeller while in a position corresponding to that shown in solid lines in Fig. 2, and in broken lines in Fig. 4, would manifest a tendency to revolve the deck and frame without changing the course. In order to give the aviator perfect control over his course, the axis 32 must first be alined with the vertical shaft 42, thus giving a vertical direction to the machine. Then the inertia and the weight of the machine, both co-operate toward stability while the aviator turns the segment to aline it with the desired direction. Then the aviator will shift the handle 40 to give the desired inclination to the propeller.

When the segment is pointed in the direction of travel, the inclination of the propeller may be adjusted as desired. When the direction of travel is to be changed, the handle 40 will again be brought to central position with the shaft 32 and axis 42 in alinement. Then the axis 42 may be rotated to cause the segment 41 to point in the direction of the desired change of flight, and the handle appropriately adjusted and locked, thereby allowing the aviator free use of both hands for control of the handle 44 and thus enabling him to direct the course of the flying machine properly.

In Fig. 4 the dirigible propeller 31 is shown as driven by a radial cylinder engine 45 of the revolving type mounted above the top of the main frame and under the directional control of the operator below the deck and within the frame. To this end the rigid non-rotatable crank shaft 46 is connected by the binnacle joint bearing 47, 48 and brackets 49 to the deck 2 and thereby to the upper part of the frame, and is fixed against rotation by some suitable means as the squared construction 46 in Fig. 5, so that the crank shaft 46 is free to be oscillated to various angular relations with the main frame and yet is held against rotation relative to such frame.

The construction and operation of motors of this type as well as of the type referred to with respect to Figs. 1 and 2 are well known to those skilled in the art, as are also the means for supplying such motors with fuel and for controlling their operation; and they are not therefore illustrated in detail.

Suitable means are provided to guard against reactional rotation of the deck in mid-air, and to this end one or more wings or rudders 50 are suitably connected to the frame, and each extends in a vertical plane to offer resistance to any tendency of the motor to set up a rotation of the frame in mid-air responsive to the reaction of the engine.

Provision for carrying fuel supply is made by providing gasolene tanks 51 above the decks. Said tanks may be connected together and may be spaced apart as desired; and a hatch 52 may be provided through which to gain access to the top of the deck from the interior of the main frame. A cover 53 connected with the deck is shown extending over the folds of the collapsed parachute to protect the same from disturbance by the blast of the propeller.

In order to provide for practical invisibility of the machine in flight, reflectors 54 are provided to stand at such an angle as to reflect the horizontal view, so that they will have the appearance of the sky when adjusted to reflect only the space above the horizon. Thus they will reflect the clouds when clouds are in the sky and they will reflect the blue, or will have the appearance of the void when there are no clouds in the sky.

These reflectors are shown as hinged at 55 to the periphery of the base and are connected by any suitable means as by lines 56 for closing the reflectors preparatory to landing. Said reflectors may be made of any suitable and well-known material for mirrors or reflectors. They may be made of plate glass through which the observer may view objects below but which without any silvering will serve to reflect the surroundings of the machine to the eye of the terrestrial beholder.

In Fig. 4 the crank shaft 46 is operated by a handle 40' pivoted at 57 to the axis 58 that is rotatable by the wheel 44 and is provided at the upper end with a segment 59 that meshes within a guide 60 with a segment 61 that is fixed to and oscillates the non-rotatable crank shaft 46. The segment 62 on the shaft 58 is engaged by the latch 43' to hold the handle 40' in required position. When the shaft 46 is upright the segments may be turned to any point desired and the handle 40' operated to deflect the propeller as required. The bracket 60 is supported by a ball bearing 63 carried by brackets 64 fixed to the deck.

I claim:—

1. A flying machine comprising a base; a deck above the base; a frame rigidly connecting the deck and the base and spacing the same apart to form a compartment; a propeller above the deck; means to revolve the propeller; an annular parachute connected at its inner edge with the deck and adapted to be collapsed and stored above the deck and near said frame, and means to expand the parachute for the purposes of descent in case of engine trouble.

2. The combination with a base, of a deck above the base; a frame rigidly connecting the deck and the base and spacing the same apart to form a compartment; a propeller above the deck; means to rotate the propeller; an annular parachute connected at its inner edge with the deck and adapted to be collapsed and stored above the deck and near said frame; spring-actuated means to expand the parachute for the purpose of descent in case of engine trouble; retaining means to hold the parachute collapsed; and means to release the retaining means to allow the parachute to be automatically expanded.

3. In a flying machine, the combination with a base and a deck, of a frame rigidly connecting the base and the deck and spacing them apart to form a compartment therebetween, an annular parachute having its inner edge connected with the frame; said parachute being collapsible for storage above the deck and close to the frame; spring means to automatically expand the parachute; means to retain the parachute in collapsed position; and means to release said retaining means.

4. In a flying machine the combination with a base; of a deck; a frame connecting the base and deck; a propeller above the deck; means to operate the propeller; an annular parachute sheet having its inner edge connected to the frame; said parachute sheet being collapsible for storage around the frame; extensible parachute frames connected at one end to the peripheral rim of the parachute sheet and adjustably connected at the inner ends to guides; retaining means to hold the frames in collapsed position and means to simultaneously extend the frames and lift their inner ends when the retaining means are released.

5. A flying machine comprising a frame having upright corner members and adapted to carry passengers; a propeller mounted above the frame; means to drive the propeller; means to control the angular relation of the propeller to the frame for the purpose of combined supporting and steering of the frame by the propeller; and means in the form of wings extending up and down the corner members, to resist reactional rotation of the frame.

6. A flying machine comprising a deck; a propeller above the deck; means to control the propeller; an extensible parachute sheet connected to the deck and collapsible with relation thereto; means to extend the parachute sheet downwardly and outwardly from the deck, there being an air vent at the deck to allow the compressed air to escape centrally upward; and a cover for the collapsed parachute to prevent the blast of the propeller from expanding the parachute.

7. The combination with a deck, of a frame, a propeller shaft extending upward through the deck; means connecting the propeller shaft with the deck and adapted to allow the shaft to oscillate relative to the deck; an engine below the deck, carried on and connected with the shaft to drive the propeller; means whereby the angular relation of the shaft to the deck may be changed; and means whereby the shaft may be positively locked in any required angular position, relative to said deck and wings secured to the frame to prevent rotary movement thereof by said propeller.

8. A flying machine comprising a main frame having equilateral sides; parachute extensible frames mounted at the sides of said main frame and adapted for lateral extension; a collapsed parachute member encircling the upper part of the main frame and having its inner edges fastened to said upper part of the main frame and its outer rim fastened to parachute extension frames and adapted and arranged to be normally stored at said upper part; such extension frames connecting the main frame to the parachute, and means operable from within the main frame to extend said parachute extension frames to prevent too rapid descent.

9. In a flying machine, the combination with a propeller supporting frame having upright members and a deck above such members and below the propeller, of a collapsible parachute normally collapsed and stored at the upper part of the frame; parachute frame sections formed of peripheral bars and side bars; guides fixed to the frame and extending up and down; slides sliding upon the guides, the inner ends of said sides bars being connected to the peripheral bars; means to hold the peripheral bars elevated and the slides and the inner ends of the side bars depressed; means to release said holding means; and means to elevate the slides and lower the peripheral bars when such release is effected.

In testimony whereof, I have hereunto set my hand at Los Angeles, California, this 26th day of December, 1917.

P. VAN LEGGELO.

Witness:
JAMES R. TOWNSEND.